United States Patent [19]

Anderson

[11] Patent Number: 4,584,040
[45] Date of Patent: Apr. 22, 1986

[54] CARPET SEAMING APPARATUS

[75] Inventor: Martin L. Anderson, Minneapolis, Minn.

[73] Assignee: Partnership of Lloyd E. Anderson, Betty P. Anderson and Martin L. Anderson, Minneapolis, Minn.

[21] Appl. No.: 574,980

[22] Filed: Jan. 30, 1984

[51] Int. Cl.$^4$ .................. B29C 65/18; B29C 65/50
[52] U.S. Cl. .................. 156/152; 156/304.4; 156/304.6; 156/391; 156/499; 156/505; 156/579; 156/583.1
[58] Field of Search ............ 156/152, 304.1, 304.3, 156/304.4, 304.6, 304.7, 391, 499, 505, 579, 583.1; 219/245

[56] References Cited

U.S. PATENT DOCUMENTS

| | | | |
|---|---|---|---|
| 2,556,476 | 6/1951 | Lamport | 156/391 |
| 3,523,176 | 8/1970 | Hill | 219/245 |
| 3,582,436 | 6/1971 | Bucher | 156/502 |
| 3,619,333 | 11/1971 | Mender | 156/583 |
| 3,651,305 | 3/1972 | Shimota | 219/243 |
| 3,660,191 | 5/1972 | Shimota et al. | 156/304.6 |
| 3,837,976 | 9/1974 | Davidsson | 156/513 |
| 3,972,768 | 8/1976 | Hill | 156/545 |
| 4,438,323 | 3/1984 | Milnes | 219/243 |

OTHER PUBLICATIONS

"Floor Covering Installation" appears in the Dec. 1983 addition of *Installation & Cleaning Specialist*, pp. 12 and 14.

Primary Examiner—Michael Wityshyn
Attorney, Agent, or Firm—Vidas & Arrett

[57] ABSTRACT

An apparatus and process for improving the method of joining abutting carpet seams with an underlying reinforced adhesive tape. The apparatus comprises a flexible elongated backing of non-stick heat reflective material and includes an adhesive tape guide and heating iron attachment point at one end. The apparatus and iron are pulled along a carpet joint as a unit, melting the adhesive portion. In another embodiment the heater is built in to the apparatus to reflect heat down onto the tape or up to the tape.

22 Claims, 7 Drawing Figures

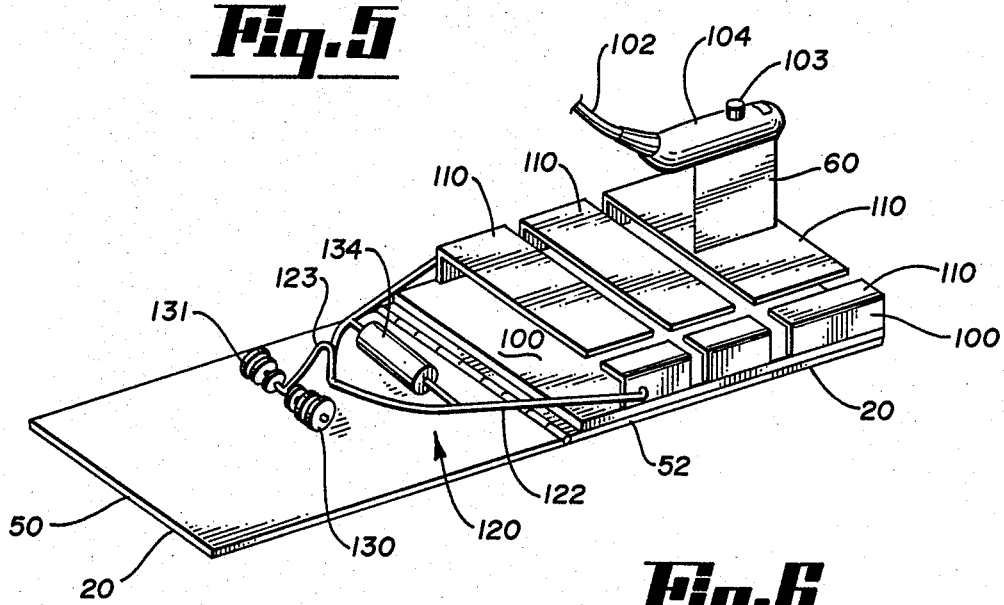
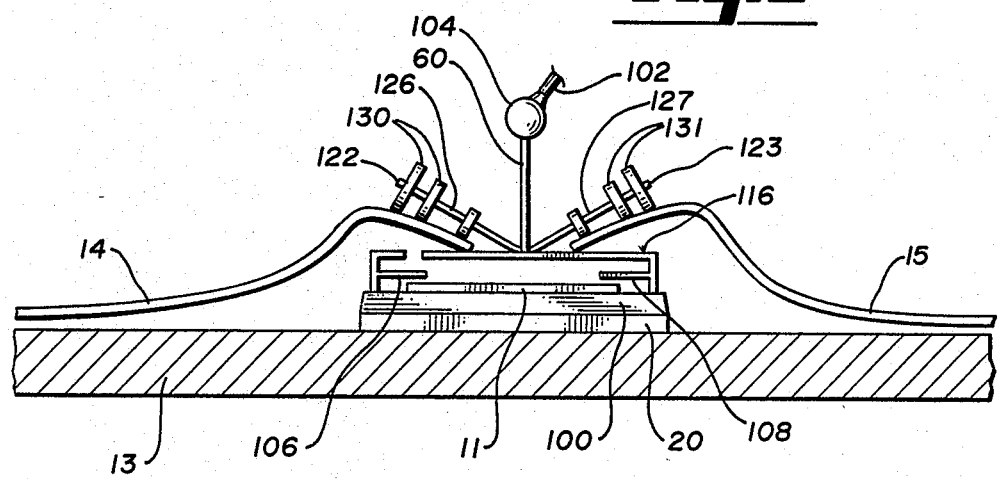
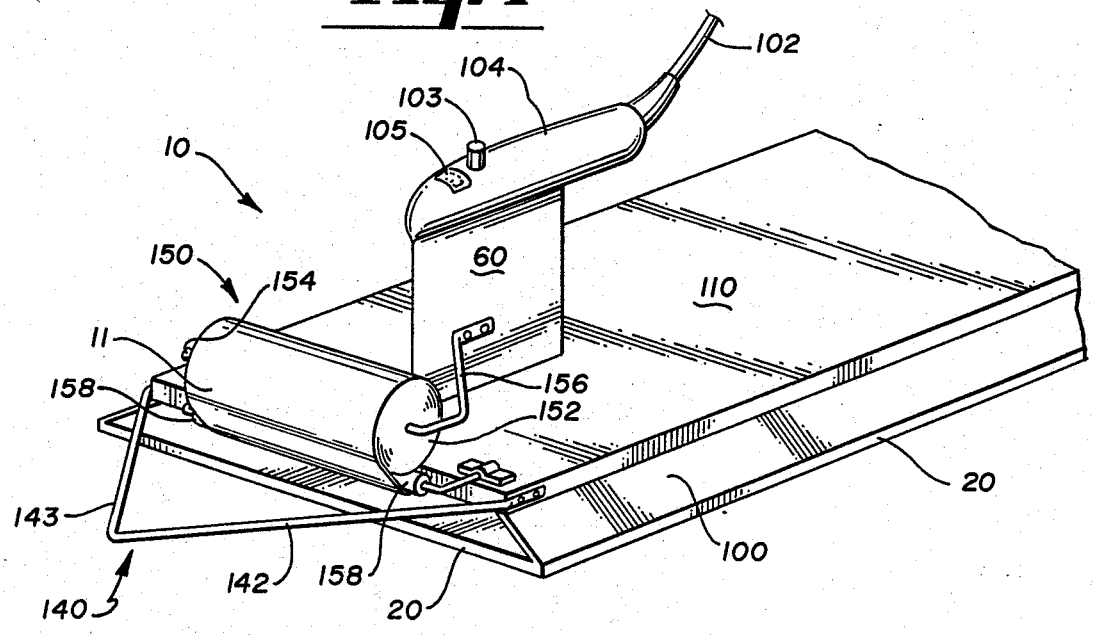

CARPET SEAMING APPARATUS

DESCRIPTION

1. Field of the Invention

The present invention relates to an apparatus for improving seam bonding of carpet or fabric.

2. Background of the Invention

Abutting edges of two pieces of carpet are frequently joined with a paper-backed, reinforced adhesive coated strip placed on the floor under the carpet backing. The adhesive is typically a hot melt adhesive which requires a heating iron maintained at approximately 500° F. to melt the adhesive, whereupon the carpet edges are butted together and pressed onto the melt adhesive strip. On cooling the two sections of carpeting are bonded in abutted relationship. It will be understood that the tape has adhesive only on the central portions of the upper facing side.

The heating tools or irons are operated at roughly 500° F. due to the nature of the adhesive, because of a large amount of heat loss through the tape into the flooring or substrate and to accomplish desired speed. The paper-backed tape may be perforated during the heating or from handling thereby allowing adhesive to contact the floor or substrate such that the carpet adheres to the tape and floor or substrate. Adherence of the carpet to the floor or substrate at a seam is undesirable. Power stretching the carpet may cause lumps if the carpet is glued to the substrate or may cause wrinkles if adhered to the floor. Also, some grades of carpeting do not tolerate the high temperature of the iron as presently used conventionally and must be folded back away from the iron as it heats the adhesive. This makes installation awkward and tends to result in poor quality seams.

It is, therefore, an object of the invention to provide an apparatus that may be operated with one hand and functions at a lower, non-burning temperature.

It is a further object of the invention to provide a material having a poor coefficient of heat transmission which underlies the adhesive tape strip as it is bonded and allows more efficient use of the heating iron thereby lowering the operating temperature required of the heating iron.

It is a further object to provide a seaming base that moves with the iron.

It is a further object to provide a guiding means which accurately guides the adhesive tape strip along the carpet joint such that the adhesive strip is easily centered below the seam.

BRIEF SUMMARY OF THE INVENTION

A flat elongated strip of a flexible, non-stick heat reflective material is formed with a width sufficient to carry conventional carpet adhesive tapes. At one end of the elongated, flexible member strip, a guide is formed which prevents the tape from sliding off the elongated member and accurately positions the tape on top of the elongated strip member.

The guide member also desirably includes an upwardly projecting, centrally located member which projects through and extends above abutting edges of carpet pieces and provides a visual indication of and guide for the location of the carpet seam bonding apparatus. In one form of the invention a conventional heating iron is attachable to the guide such that the iron heating member is adapted and arranged to rest on or directly proximate to the elongated strip behind the guide. Preferably, in this form, the heating member is permanently secured to the elongated strip and presents a low profile.

In operation, a length of reinforced hot melt adhesive tape is inserted through the guide of the carpet seam bonding apparatus and the tape and apparatus are positioned beneath abutting edges of the carpet to be seamed. An iron preheated to the desired operating temperature to melt the hot melt glue is attached to the guide and the operator pushes or pulls the apparatus between the abutting edges until the opposite end of the carpet to be joined is reached. Due to the flexibility of the underlying elongated seaming base member of the apparatus, the apparatus may be readily arced or flexed upwardly and out from under the carpet without significantly raising the carpet.

The guide accurately positions the tape substantially equally to each side of the abutting edges of the carpet since it is centered over the tape and elongated member and is self-centered by the vertically extending member which preferably is detachable. Heat reflective material of the elongated member provided greater efficiency in heating which allows the use of a lower operating temperature on the iron. This decreases or eliminates the incidence of damage to the carpet pile and backing and also substrate such as padding. The non-stick nature of the elongated member makes it easy to clean if the melted adhesive sticks to the apparatus.

BRIEF DESCRIPTION OF THE DRAWINGS

The detailed description of embodiments of the invention is hereafter described with specific reference being made to the drawings in which:

FIG. 5 is a perspective view of the apparatus of Example II with a plurality of guides;

FIG. 6 is an end view of the device of FIG. 6 with carpet sections in position; and FIG. 7 is a partial perspective view of the apparatus of FIG. 5 with a tape roller and spreader in position.

DETAILED DESCRIPTION OF THE INVENTION

EXAMPLE I

Figure 1:
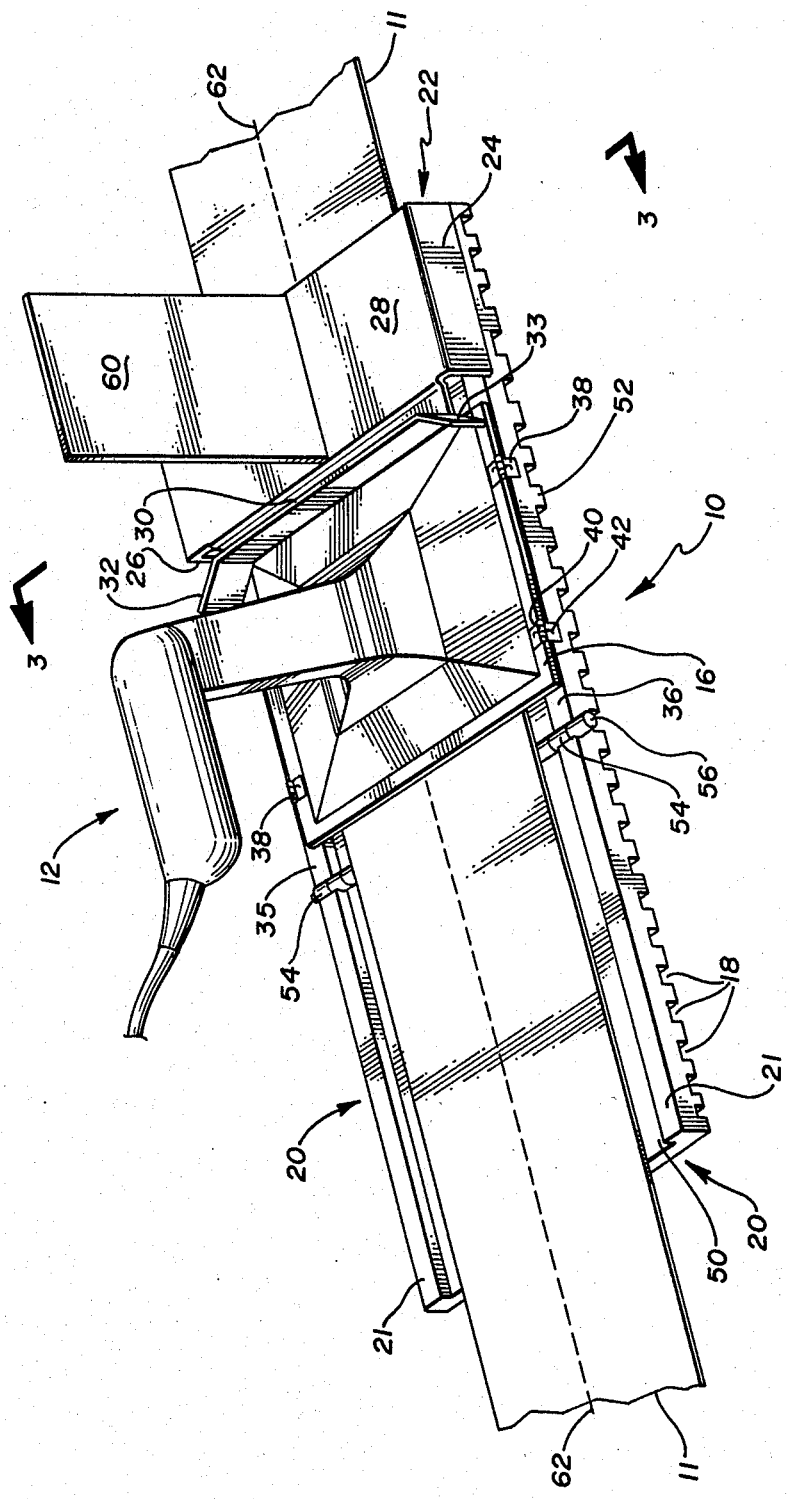
FIG. 1 is a perspective view of the seambonding apparatus with adhesive tape and a heating iron in position.
Figure 2:
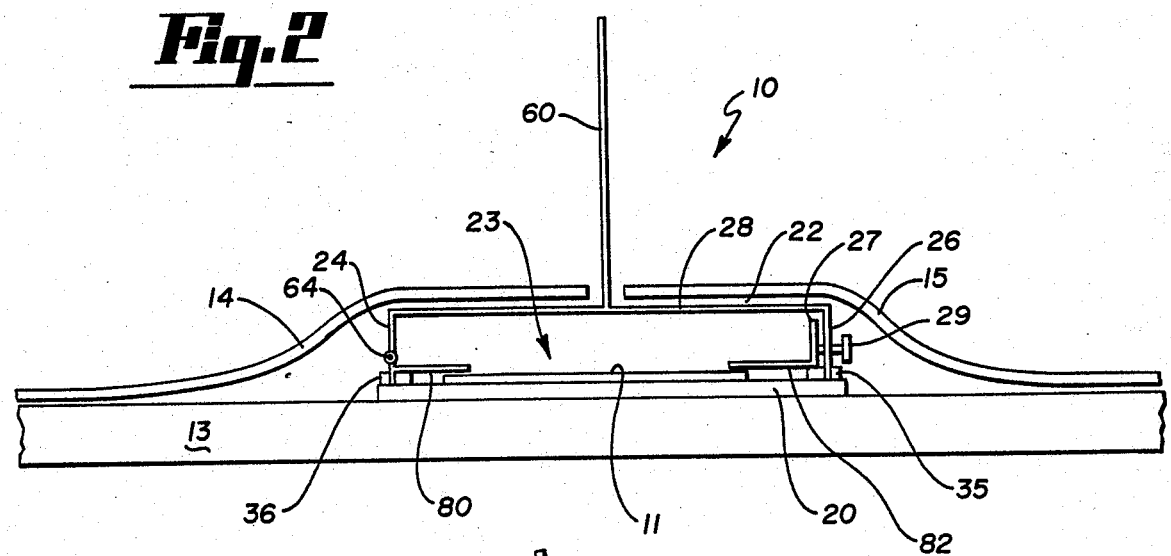
FIG. 2 is an end view of the invention with adhesive containing tape and carpet sections in position.
Figure 3:
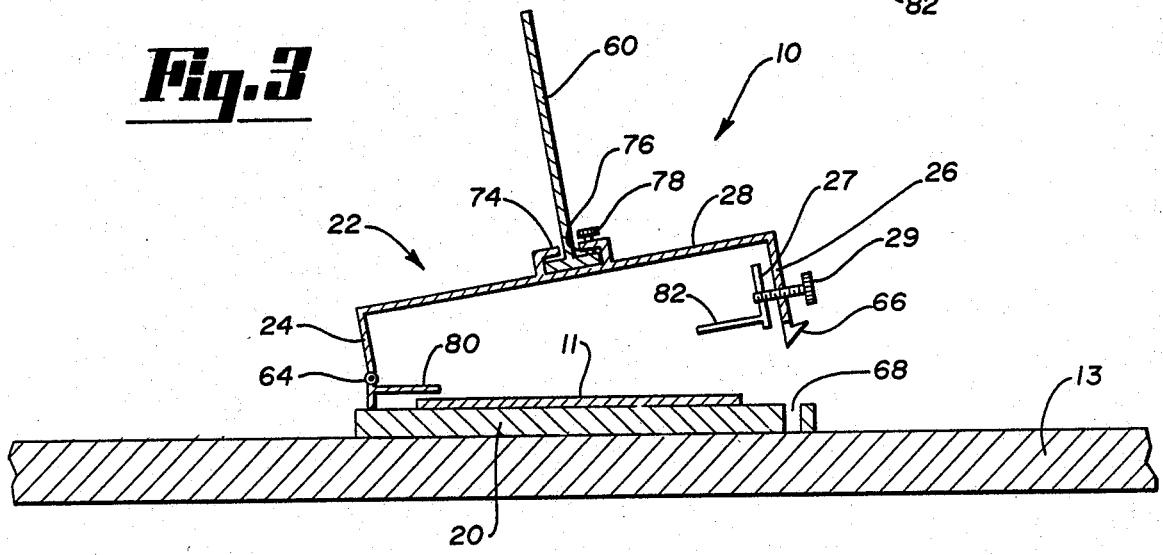
FIG. 3 is a cross-sectional view of the invention through line 3—3 of FIG. 1 with the catch undone.

FIGS. 1, 2 and 3 show the seambonding apparatus 10, adhesive tape 11, heating iron 12 and flooring or padding 13. Carpet sections 14 and 15 are shown in position over apparatus 10 in FIG. 2.

The carpet seambonding apparatus includes an elongated, flexible backing 20 whose width is sufficient to carry conventional paper-backed reinforced, hot melt adhesive tape 11. Backing 20 may be made flexible in many ways. The backing may be formed of flexible material which is thin enough to provide the desired flexibility. Alternatively, backing 20 may be found from many discrete short sections that are hinged together in any conventional manner. Preferably, backing 20 includes a plurality of kerfs 18 cut into its lower surface such that the flexibility is increased. The backing 20 should be capable of bending over at least a 90° angle without creasing or breaking. Most preferably, backing 20 may flex so as to be able to fold back upon itself, thereby decreasing its storage length.

The elongated, flexible backing strip 20 is desirably formed from a material with a low coefficient of heat transmission, and, in the preferred form, will include a heat reflective layer on the back side or interiorly as a laminate. The preferred material adheres poorly, if at all, to the adhesive employed. Preferably, the material is a polytetrafluoroethylene polymer which imparts a non-stick finish to flexible strip 20. The upper surface is preferably smooth and polished to provide a low frictional resistance between adhesive tape 11 and backing 20. Preferably, backing 20 includes longitudinally extending ribs 21 on its upper surface to act as an adhesive tape guide. Ribs 21 tend to keep the adhesive tape in position by decreasing transverse sliding. Alternatively, ribs 21 may be formed only at the longitudinal edges of backing 20 so as to provide a guide trough 23 for the adhesive containing tape.

An adhesive tape guide 22 is attached to the flexible backing adjacent one end in any suitable manner, such as by rivets. Tape guide 22 includes upstanding lips 24 and 26 on each side of backing 20 such that adhesive tape 11 placed on top of the strip remains in place.

Preferably, tape guide 22 is easily detached such that a second tape guide of the same construction can be substituted. This substitution makes adjustments readily available for different adhesive tape widths. Alternatively, tape guide 22 may include an adjustable lip 27 between lips 24 and 26 with an adjustment screw 29 threaded through lip 24. Rotation of screw 20 causes adjustable lip 27 to move changing the tape guide 22 width.

Upstanding lips 24 and 26 may be integrally joined to flexible backing 20. Preferably, guide 22 is attached adjacent one end of flexible backing 20 and includes a horizontal bridge portion 28 connecting upstanding lips 24 and 26. A tubular opening is defined therebetween which allows adhesive tape 11 is freely pass therethrough while insuring that the tape remains over flexible backing 20.

The conventional heating iron 12 includes a lower lip 16 around its periphery. Preferably, guide 22 includes an iron stop plates 30 which includes raised wings 32, 33 which extends over lip 16 of iron 12 and limits forward and upward movement of the iron relative to apparatus 10.

Preferably, a pair of longitudinally extending spacers 35, 36 extend along the longitudinal upper edges of backing 20 for the length of iron 12. The iron rests directly on spacers 35, 36 and is kept above the backing and adhesive strip so as to prevent the direct contact of the iron with the adhesive. Most preferably, the iron is rigidly held in position with respect to stop plate and spacers 35, 36 through the use of metal clips 38 which extend over lip 16 of iron 12. The clips may either simply allow the iron to be inserted by sliding into position or may include hinges 40 loaded with springs 42 such that the clips apply pressure to iron lip 16. The spacers may merely be a portion of the longitudinal ribs 21.

It has been found that the seambonding of carpet edges differs depending on whether an underlayment is employed. When a resilient pad is placed below the carpet, it is more difficult to press the carpet edges onto the melted adhesive of tape 11 than if a solid surface such as concrete or wood is directly beneath the carpet. On solid surfaces such as wood and concrete, so much heat is lost when the adhesive tape is laid directly on such surfaces that the adhesive may not melt properly.

When the carpet is laid directly on relatively inflexible surfaces, such as concrete and wood, backing 20 is only required to extend the length of iron 12. The melted adhesive cools very rapidly when the paper backing of the adhesive tape contacts hard flooring. Therefore, a long trailing end of backing 20 beyond iron 12 is not required to prevent the adhesive from sticking to the hard flooring.

Carpet that is laid upon flexible surfaces or pads must be firmly pressed into the melted adhesive of tape 11. A backing 20 which extends well beyond iron 12 provides a rigid surface such that the carpet edges may be firmly pressed together onto the adhesive tape. The length of backing 20 in such applications is preferably about twice the length of heating iron 12. This provides a backing to which pressure may be applied during bonding and allows the hot melt adhesive to cool before contacting the subflooring 13.

The low transmission of heat through backing 20 allows the seambonding of carpet directly above hard surfaces such as concrete and wood. Without the apparatus of the invention, temperatures as high as 500° F. (260° C.) were required to melt the adhesive due to the massive heat loss to the flooring. The backing 20 allows the use of an iron whose external surface temperature is about 300° F. (149° C.) or lower which lessens damage to the carpet scrim.

The seambonding appartus 10 may desirably be formed in several sections such that it may be disassembled for storage or for use when installing carpet without an underlaying pad. Backing 20 may include a trailing end 50 which is detachable from the backing portion 52 under which the iron is positioned. Trailing end 50 may be connected to main backing portion 52 by means of a hinge 54 and removable pin 56. Alternatively, the trailing end 50 may engage with backing portion 52 in a sliding, telescoping manner such that the trailing end 50 may be secured beneath backing portion 52 when used over hard flooring or for storage. Any means for detaching trailing portion 50 or for doubling trailing portion 50 under backing portion 52 may be utilized.

As shown in FIGS. 1, 2, and 3, guide 22 also includes a vertically extending blade 60 constructed and arranged to be oriented along the longitudinal axis 62 of the apparatus 10. Blade 60 thereby functions as both a visual indicator of the forward end 72 of the apparatus and as a guide for maintaining the apparatus in the desired location relative to the carpeting edges to be joined. Blade 60 projects through the edges of carpet sections 14 and 15 and accurately positions and centers adhesive strip 11 under the edges of carpet sections 14 and 15. Blade 60 is preferably of narrow width so as to allow carpet section 14 and 15 edges of nearly meet. When blade 60 is formed of steel, a width of about 1.5 millimeters provides sufficient strength.

Preferably, rather than starting the operation by feeding adhesive tape through the slot defined by guide 22 and bridge portion 28, tape guide 22 is hinged from one side as shown in FIGS. 2 and 3. Lip 26 may include hinge 64, (which may be spring loaded) attached to flexible backing 20. Lip 24 also includes catch 66 which engages with slot 68 in flexible backing 20 when lips 24 and 26 are squeezed together flexing bridge portion 28.

In this manner, an operator merely unlatches tape guide 22 to insert an adhesive tape 11 into position.

As an alternatives, adhesive tape may be placed in position on top of backing 20 by forming a longitudinal slot in bridge portion 28 adjacent upstanding lip 24 or 26. Adhesive tape is then merely slipped through the slot and positioned on top of backing 20. Lips 24, 26, bridge portion 28 and blade 60 may be formed from one piece of aluminum.

The length of blade 60 is preferably greater than its width such that is acts to position the apparatus 10 within the carpet seam. It has been found that a length of approximately two inches insures that the longitudinal axis 62 of apparatus 10 is maintained directly below carpet seam.

Preferably, vertically extending blade 60 is detachable from seambonding apparatus 10 to make storage easier. For example, blade 60 may include a lower leg 74 that may slidingly engage a mating recess 76 in guide 22 as shown in FIG. 3. Longitudinal movement of blade 60 within recess 76 may be limited by the addition of a set screw 78 as shown. Alternatively, the entire guide may be removable from backing 20.

Guide 22 may also include projections 80 and 82 as shown in FIGS. 2 and 3 as an aid to positioning and holding adhesive strips on top of backing 20. Such projections prevent the adhesive tape from lifting upwardly while heat is applied. Projections 80 and 82 may be adjusted such that different width adhesive tapes may be used with the same apparatus.

In operation, an adhesive tape 11, comprised of a hot melt glue centered on a strip of fiber reinforced paper backing, is inserted into tape guide 22 between upstanding lips 24 and 26 and horizontal bridge portion 28. When the heating iron 12 has reached the operating temperature for the type of hot melt adhesive employed, the iron is attached to the seambonding apparatus.

With carpet sections 14 and 15 positioned between each side of blade 60, iron 12 and seambonding apparatus 10 are pulled or pushed through the carpet seam 72. The tape is accurately centered with respect to carpet sections 14 and 15 due to vertically extending blade 60. The melted adhesive adheres to the carpet backing and will not adhere to flexible strip 20. It has been found that the required operating temperatures of heating iron 12 may be reduced from about 500° F. to as low as 250° F. due to the heatreflective flexible strip 20.

EXAMPLE II

Figure 4:
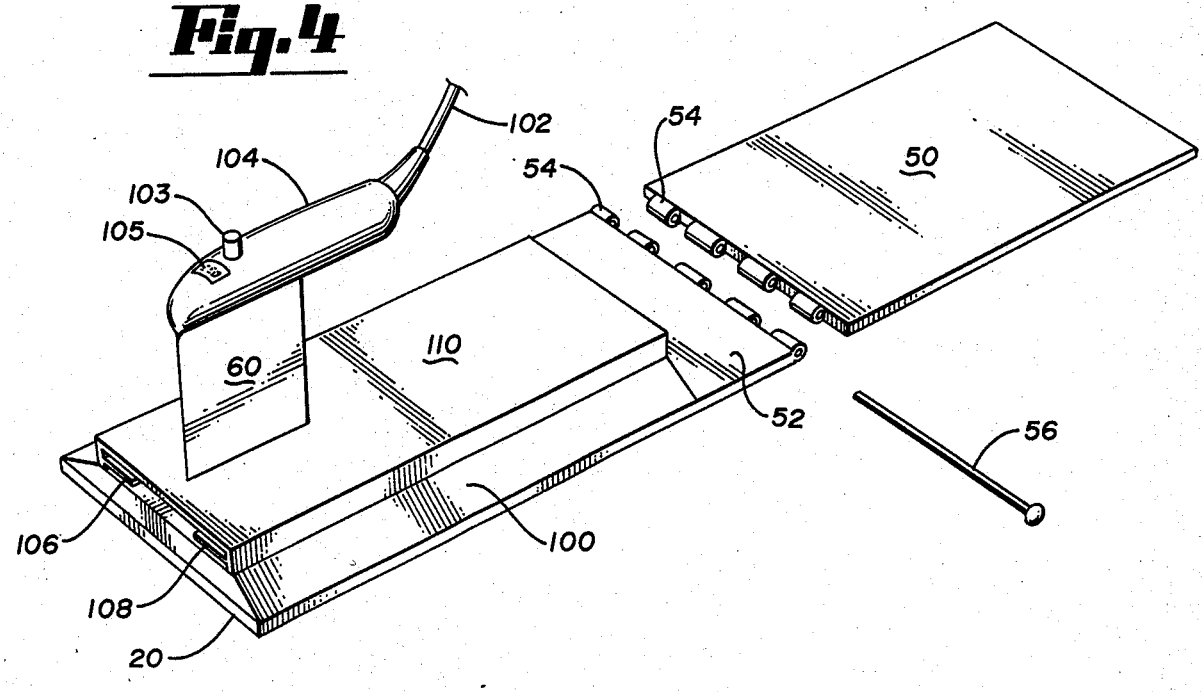
FIG. 4 is a perspective view of the preferred embodiment of the invention.

The preferred embodiment, as shown in FIG. 4, utilizes a built in heating device. Elongated flexible backing 20 carries a flat, elongated heater 100. Heater 100 carries an upper plate heated by electrical resistance. Such heating units are well known in the art and are available from numerous suppliers. Heat is reflected upwardly from heater 100. Heater 100 is positioned beneath tape guide 110 and preferably extends longitudinally along axis 62 about 8-10 inches.

Heater 100 is bonded to strip 20, such as by high temperature adhesives. Wires 102 to heater 100 extend upwardly through guide 110 and out of handle 104. Heater 100 prevents melted glue from pushing out along the sides of the adhesive tape by avoiding direct contact of an iron to the adhesive. Heater 100 also prevents glue from being pushed forward along the adhesive tape. Since glue stays where it should be, the seambonding device of the invention makes it possible to use less hot melt adhesive on the adhesive tapes. A thermostat control 103 and temperature readout gauge 105 may be included to provide operator controls to heater 100.

Hot melt adhesive generally covers only the middle two-thirds of an adhesive tape strip. As an aid to positioning adhesive strips and holding adhesive tape strips on top of heater 100, guide 110 may include projections 106 and 108 as shown in FIG. 4. Such projections prevent the adhesive tape from lifting upwardly while heat is applied.

When heater 100 radiates heat upwardly onto the adhesive strip rather than downwardly, flexible backing 20 does not provide the heat reflection benefits. However, guide 110 reflects heat back onto the adhesive strip. To maximize heating efficiency, a plurality of guides 110 may be placed along flexible backing 20 over heater 100. To maintain flexibility, it is desirable to from heater 100 and guides or cross members 110 as individual segments. Heater sections 110 may be hingedly joined or separated on flexible strip 20 such that the seambonding apparatus may flex in the heating area.

The use of additional guides 110 as shown in FIG. 5 creates an oven-like effect, with each guide reflecting heat, thereby lowering the heater temperature required.

Adhesive tape guide 110 may be formed with a highly heat reflective surface facing the adhesive strip. Guide 110 may be formed so as to define a parabolic arch over flexible strip 20 such that heat is focused and reflected onto the tape from the heater. Alternatively, the lower surface of adhesive tape guide 110 may include a low profile heater to radiate heat downwardly onto the adhesive tape. The heater and supporting guide 110 may both be formed such that heat is focused to radiate downwardly onto the adhesive tape. A parabolic shaped guide and heater would maximize heating efficiency.

Elongated backing 20 is preferably flexible so as to be easily insertable under carpet edge and to facilitate its removal. For example, when a completed, bonded seam extends to a wall elongated strip 20 most preferably may flex over at least a 90 degree angle without creasing or breaking. This allows the seambonding apparatus to be removed without the need to raise the carpet which may disturb the newly adhered carpet edge.

The carpet seambonding apparatus of Examples I and II may include a device as shown in FIGS. 5 and 6 to press carpet sections 14 and 15 onto the melted glue and force the carpet edges together. Yoke 120 comprises a pair of rods 122 and 123 which are pivotally mounted to guide upstanding lips 24 and 26, respectively, and extends over flexible strip 20 over the heater. Independent axles 126 and 127 depend from the free ends of rods 122 and 123. A series of rotatable wheels 130 and 131 are journaled to axles 126 and 127. As shown in FIG. 5, wheels 130, 131 and axles 126, 127 are constructed and arranged such that a reverse snowplow effect is developed. The axles 126, 127 angle downwardly toward flexible strip 20 and away from guide 22.

Handle 134 may connect rods 122 and 123 together such that downward pressure may be applied onto the carpet through wheels 130, 131. The carpet is pressed down onto the adhesive strip past the heater. The angled wheels force the carpet edges together.

The carpet seambonding apparatus of the invention may also include a plow-like device 140 which extends in front of the apparatus 10 and functions to open the carpet seam so as to facilitate the passage of apparatus 10 through the seam. A pair of spreader bars 142, 143 may extend from guide 110 forwardly as shown in FIG. 7 so as to function as a plow.

The reinforced adhesive tape strip 11 may be supplied to apparatus 10 from a roller 150 mounted above guide 22. A roll of tape 152 may be inserted over a generally horizontal bar 154 attached to an arm 156 that is mounted to vertically extending blade 60 or handle 104. Preferably, roller 150 is removable from its attachment to apparatus 10 for ease of storing apparatus 10. Adhesive tape 11 passes under roller 158 as shown to guide the tape into guides 110.

In considering the invention, it should be remembered that the present disclosure is illustrative only and that the scope of the invention should be determined by the appended claims.

What is claimed is:

1. In a method for bonding seams of abutting carpet edges including laying a reinforced hot melt adhesive tape below the edges to be sealed, applying heat to said adhesive tape below the edges to be sealed with a heated carpet seam iron and applying pressure to said carpet edges onto said hot melted adhesive tape such that said edges are bonded together, the improvement comprising:

laying said reinforced hot melt adhesive tape on top of a heat reflective, non-stick surfaced tool and through a guide including an upstanding member extending between said carpet edges, securing said iron to said guide and sliding said tool and iron along said tape and removing said tool and iron at the end of said sealed edges.

2. A carpet seam bonding apparatus comprising:
(a) a flexible, elongated backing of non-stick material having a low coefficient of heat transfer;
(b) guiding means for positioning a reinforced adhesive tape strip on top of said elongated strip and visually defining the position of said tape strip when edges of a carpet are abutted over said tape and said elongated strip; and
(c) heating means in operative connection to said guiding means such that heat may be applied to the reinforced adhesive tape beneath said heating means, said heating means including a handle which pulls said heating means and carpet seam bonding apparatus along abutted carpet edges.

3. A carpet seam-bonding apparatus comprising:
(a) a flexible, heat reflective, elongated member;
(b) guide means for positioning a reinforced adhesive tape strip on top of said elongated member, said guide means being constructed and arranged such that a portion extends vertically upward for providing an indicator of the position of said carpet seambonding apparatus when positioned under two abutting edges of carpet; and
(c) heating means attached to said guide means such that heat may be applied to a reinforced adhesive tape strip positioned on top of said elongated member.

4. The apparatus of claim 3 wherein said elongated member is formed with a smooth surface resistive to said tape adhesive.

5. The apparatus of claim 4 wherein said elongated member is constructed of a polytetrafluoroethylene.

6. The apparatus of claim 4 wherein said guide means includes a vertically extending blade constructed and arranged so as to protrude above abutting carpet edges positioned over said apparatus and to present a relatively narrow profile between said carpet edges.

7. The apparatus of claim 6 wherein said guide means includes vertically upstanding lips and means for adjusting the tape guide width between said lips.

8. The apparatus of claim 7 wherein said guide means is constructed and arranged with a hinge means for defining and opening a tape slot formed by said lips, flexible member and vertically extending blade.

9. The apparatus of claim 3 wherein said guide means attached to said heating means includes a handle constructed and arranged such that movement of the handle causes the apparatus to move with said heating means.

10. The apparatus of claim 3 wherein said flexible elongated member is resilient and may be flexed over at least a 90° angle without creasing or breaking.

11. A carpet seambonding apparatus comprising:
(a) a flexible, elongated backing formed with material having a low coefficient of heat transmission;
(b) guide means for aligning a reiforced adhesive tape strip above said backing along the longitudinal axis of said backing; and
(c) heating means for directing heat to the adhesive on said tape so as to melt said adhesive, said heating means being constructed and arranged so as to move as a unit with said flexible backing.

12. The apparatus of claim 11 wherein said heating means includes a heat reflecting chamber means defined above said backing for retaining heat within said chamber so as to improved the heating efficiency of said apparatus.

13. The apparatus of claim 11 wherein said guide means includes a vertically extending blade constructed and arranged so as to protrude above abutting carpet edges positioned over said apparatus and to present a relatively narrow profile between said carpet edges.

14. The apparatus of claim 11 wherein said backing is made more flexible by the addition of a plurality of kerfs across its lateral axis on its lower surface.

15. The apparatus of claim 11 wherein said flexible backing is constructed and arranged such that it may be folded back upon itself longitudinally so as to decrease its overall length for storage.

16. A carpet seambonding apparatus for use with a heating means comprising:
(a) a flexible, elongated backing formed with material having a low coefficient of heat transmission;
(b) guide means for aligning a reinforced adhesive tape strip on top of said elongated backing; and
(c) means for positioning a heating means above said adhesive tape strip on said backing, said means being constructed and arranged such that said apparatus and said heating means may be moved as a unit.

17. The apparatus of claim 16 wherein said positioning means includes a stop plate means which prevents forward movement of a heating iron relative to said apparatus and a plurality of hinged iron hold down clips which are constructed and arranged to releasably secure said iron to said apparatus above said backing so as to permit a length of adhesive tape strip to pass between said backing and said heating iron.

18. The apparatus of claim 16 wherein said backing includes a plurality of kerfs lateral to its longitudinal axis so as to increase the flexibility of said backing.

19. The apparatus of claim 16 wherein said guide means includes a vertically extending blade constructed and arranged so as to protrude above abutting carpet edges positioned over said apparatus and to present a relatively narrow profile between said carpet edges.

20. The apparatus of claim 16 wherein said flexible backing is constructed and arranged such that it may be folded back upon itself longitudinally so as to decrease its overall length for storage.

21. The apparatus of claim 16 wherein said flexible backing is formed from at least two discrete sections such that one section underlies the heating means and the other sections may be detachably removed and added as desired.

22. The apparatus of claim 16 wherein said guide means includes vertically upstanding lips and means for adjusting the tape guide width between said lips so as to be adaptable to different adhesive tape widths.

* * * * *